US012703080B2

(12) United States Patent
Geng et al.

(10) Patent No.: US 12,703,080 B2
(45) Date of Patent: Aug. 11, 2026

(54) WALKING MECHANISM FOR QUADRUPED ROBOT, AND QUADRUPED ROBOT HAVING THE SAME

(71) Applicant: IXOVA INC, Dover, DE (US)

(72) Inventors: Kangming Geng, Hong Kong (HK); Angela Yijia Geng, Los Angeles, CA (US)

(73) Assignee: IXOVA INC, Dover, DE (US)

( * ) Notice: Subject to any disclaimer, the term of this patent is extended or adjusted under 35 U.S.C. 154(b) by 0 days.

(21) Appl. No.: 19/403,028

(22) Filed: Nov. 27, 2025

(65) Prior Publication Data

US 2026/0084289 A1 Mar. 26, 2026

(51) Int. Cl.

| | |
|---|---|
| ***B25J 9/00*** | (2006.01) |
| ***B25J 5/00*** | (2006.01) |
| ***B25J 9/10*** | (2006.01) |
| ***B25J 19/02*** | (2006.01) |
| ***B62D 57/02*** | (2006.01) |

(52) U.S. Cl.

CPC ............ *B25J 9/0009* (2013.01); *B25J 5/007* (2013.01); *B25J 9/102* (2013.01); *B25J 19/023* (2013.01); *B62D 57/022* (2013.01)

(58) Field of Classification Search

CPC .. B62D 57/028; B62D 57/022; B62D 57/032; B25J 5/007

See application file for complete search history.

(56) References Cited

U.S. PATENT DOCUMENTS

| | | | | |
|---|---|---|---|---|
| 6,112,843 | A * | 9/2000 | Wilcox | B60K 17/36 180/209 |
| 7,426,970 | B2 * | 9/2008 | Olsen | B60K 7/0007 180/908 |
| 7,570,005 | B2 * | 8/2009 | Hashimoto | B25J 5/007 318/587 |
| 9,957,002 | B2 * | 5/2018 | Klassen | B60F 3/0007 |
| 11,407,120 | B2 * | 8/2022 | Sakamoto | B62D 57/032 |
| 12,391,323 | B1 * | 8/2025 | Sarhad | B62D 57/028 |
| 2008/0105481 | A1 * | 5/2008 | Hutcheson | B60L 15/20 180/209 |
| 2014/0146161 | A1 * | 5/2014 | Sibai | B25J 5/007 348/84 |

(Continued)

FOREIGN PATENT DOCUMENTS

| | | | | |
|---|---|---|---|---|
| CN | 108674514 | A * | 10/2018 | B62D 57/028 |

OTHER PUBLICATIONS

CN-108674514-A translation (Year: 2018).*

*Primary Examiner* — Christopher B Wehrly

(57) ABSTRACT

A walking mechanism for a quadruped robot includes a support arm and a wheel mechanism. The wheel mechanism includes a first roller connected to a first connecting rod and a second roller connected to a second connecting rod. The first and second connecting rods are controlled to rotate or swing within a vertical plane, causing the wheel mechanism to be in a first state or a second state. In the first state, the first connecting rod is deployed to a first angle relative to a central axis of the support arm, and the second connecting rod is folded upward. In the second state, the first and second connecting rods are deployed to a preset angle. The walking mechanism can both ensure the energy utilization efficiency and travel speed of the quadruped robot on flat terrain, and guarantee the traversability on complex terrain.

14 Claims, 4 Drawing Sheets

M

(56) References Cited

U.S. PATENT DOCUMENTS

| | | | | |
|---|---|---|---|---|
| 2019/0118881 | A1* | 4/2019 | Mcginn | B62D 57/028 |
| 2020/0101620 | A1* | 4/2020 | Sakamoto | B25J 13/085 |
| 2021/0009219 | A1* | 1/2021 | Zarrouk | B62D 57/024 |
| 2022/0274657 | A1* | 9/2022 | Zhang | B62D 57/032 |
| 2022/0395974 | A1* | 12/2022 | Balasubramanian | B62D 57/028 |
| 2024/0058943 | A1* | 2/2024 | Takasugi | B25J 5/007 |
| 2024/0148575 | A1* | 5/2024 | Ito | B60L 15/20 |
| 2024/0181805 | A1* | 6/2024 | Lee | B60B 15/16 |
| 2024/0351710 | A1* | 10/2024 | Fu | B62D 57/028 |
| 2025/0276439 | A1* | 9/2025 | Park | B25J 18/00 |
| 2025/0303581 | A1* | 10/2025 | Gohl | B25J 13/084 |
| 2025/0353195 | A1* | 11/2025 | Wang | B25J 19/0008 |

* cited by examiner

WALKING MECHANISM FOR QUADRUPED ROBOT, AND QUADRUPED ROBOT HAVING THE SAME

FIELD OF THE INVENTION

The present invention relates to technical field of quadruped robots, and more particularly to a walking mechanism for a quadruped robot and a quadruped robot having the same.

BACKGROUND OF THE INVENTION

In recent years, quadruped robots have gradually become a research focus due to their superior terrain adaptability. Traditional quadruped robots commonly employ a purely legged structure (such as classic designs like Boston Dynamics'LittleDog), which achieves walking on unstructured terrain through coordinated movement of multiple joints. Although such quadruped robots possess the ability to cross obstacles, they suffer from significant drawbacks. First, the energy efficiency of movement is low, which requires complex gait planning and control algorithms to maintain walking stability. Second, the movement speed on flat surfaces is limited, making it difficult to meet the demand for rapid mobility in scenarios such as engineering exploration and military reconnaissance. To improve the efficiency, improved solutions using wheeled drives have been proposed. For instance, continuous ground support is applied in wheeled robots so as to achieve high-speed movement, but the risk of structural failure when climbing slopes exceeding 15° or crossing step obstacles is still possible.

Recently, leg-wheel hybrid quadruped robots are proposed by combining the advantages of wheeled and legged structures. Early examples of the leg-wheel hybrid quadruped robots, such as the Quattroped, utilizes a morphology transition mechanism to switch between wheeled and legged modes by reconfiguring drive units, but requires separate actuators, leading to increased system redundancy. Similarly, some cat-like quadruped robots can enhance obstacle-crossing capability by configuring active waist and flexible legs, but fails to effectively address the terrain limitations of wheeled drives. Existing leg-wheel hybrid structures primarily face two major technical bottlenecks. Firstly, the mechanism for switching between wheeled and legged modes is complex, resulting in increased weight and energy consumption; and secondly, the wheeled drive units lack a multi-terrain adaptive control mechanism, unable to simultaneously obtain high efficiency on flat surfaces and traversability on complex terrain.

SUMMARY OF THE INVENTION

The objective of the present invention is to provide a walking mechanism for a quadruped robot based on a purely wheeled drive and a quadruped robot having the same, which satisfies dynamic terrain adaptability, in order to solve the aforementioned technical problems.

To achieve the above objective, the present invention provides a walking mechanism for a quadruped robot including a support arm, including a first end configured to connect to a main body of the quadruped robot and a second end provided with a control device; and a wheel mechanism, including a first roller connected to the control device via a first connecting rod and a second roller connected to the control device via a second connecting rod. The control device is configured to control the first connecting rod and the second connecting rod to rotate or swing within a vertical plane, causing the wheel mechanism to be in a first state or a second state. In the first state, the first connecting rod is deployed to a first angle relative to a central axis of the support arm, and the second connecting rod is folded upward, such that the support arm lands and walks only basing on the first roller, with the second roller suspended. In the second state, the first connecting rod is deployed to a second angle relative to the central axis of the support arm, and the second connecting rod is deployed to a third angle relative to the central axis of the support arm, such that the support arm lands and walks basing on both the first roller and the second roller, wherein the second angle is greater than the first angle.

As a preferable embodiment, the first angle is zero, and the second angle is indicated by $\alpha$ which satisfies: $30° \leq \alpha \leq 60°$.

As a preferable embodiment, the third angle is equal to the second angle.

As a preferable embodiment, the control device includes a first gear arranged within the support arm and a drive motor connected to the first gear for transmission; an end of the first connecting rod opposite to the first roller is provided with a second gear meshing with the first gear, and an end of the second connecting rod opposite to the second roller is provided with a third gear meshing with the first gear.

As a preferable embodiment, hub motors are respectively disposed within the first roller and the second roller.

As a preferable embodiment, the support arm is provided with an accommodation cavity inside, and a side surface of the support arm is provided with an opening communicating with the accommodation cavity; when the wheel mechanism is in the second state, the second connecting rod and the second roller are accommodated within the accommodation cavity via the opening.

As a preferable embodiment, the second connecting rod is provided with a locking portion, and an inner side wall of the support arm is provided with a matching portion; when the second connecting rod is accommodated within the accommodation cavity, the locking portion is locked with the matching portion.

As a preferable embodiment, the locking portion includes any one of a suction cup, a magnetic member, or an engagement member.

As a preferable embodiment, the control device further includes a camera provided on an exterior of the first end of the support arm for detecting ground conditions around the support arm, and the wheel mechanism adaptively selects to be in the first state or the second state based on feedback from the camera.

The present invention further provides a quadruped robot including a main body and walking mechanisms connected to the main body, wherein each of the walking mechanisms is as mentioned above.

Compared with the prior art, the walking mechanism for a quadruped robot provided by the present invention enables autonomous switching of the wheel mechanism between a single-wheel drive (first state) and a dual-wheel cooperative drive (second state) by controlling the rotation angle or swing angles of the first connecting rod and the second connecting rod. In flat terrain scenarios, the second roller is pivoted upward to fold, with only the first roller contacting the ground, which significantly reduces rolling friction resistance and fully leveraging the high efficiency and high-speed characteristics of wheeled drives. In scenarios such as slope climbing or step across, the first connecting rod and the second connecting rod are synchronously deployed to preset angles, thus both rollers simultaneously contact support with the slope surface or step edges. In such a way, the ground contact area of the dual wheels is greatly increased to enhance the driving torque and achieve continuous obstacle crossing through alternate traction of the dual wheels, thereby completely overcoming the adaptability limitations of traditional wheeled structures on complex terrain. This dual-wheel cooperative mechanism allows the quadruped robot to maintain high-speed continuous movement characteristics even on unstructured terrain like stair climbing or gravel roads, achieving both high efficiency of wheeled robot and traversability of legged robot. By this token, the aforementioned walking mechanism for a quadruped robot can both ensure the energy utilization efficiency and travel speed of the quadruped robot on flat terrain, and guarantee the traversability on complex terrain.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

To elaborate on the technical content, structural features, objectives, and effects of the present invention, the following detailed explanation is provided in conjunction with embodiments and accompanying drawings.

Figure 1:
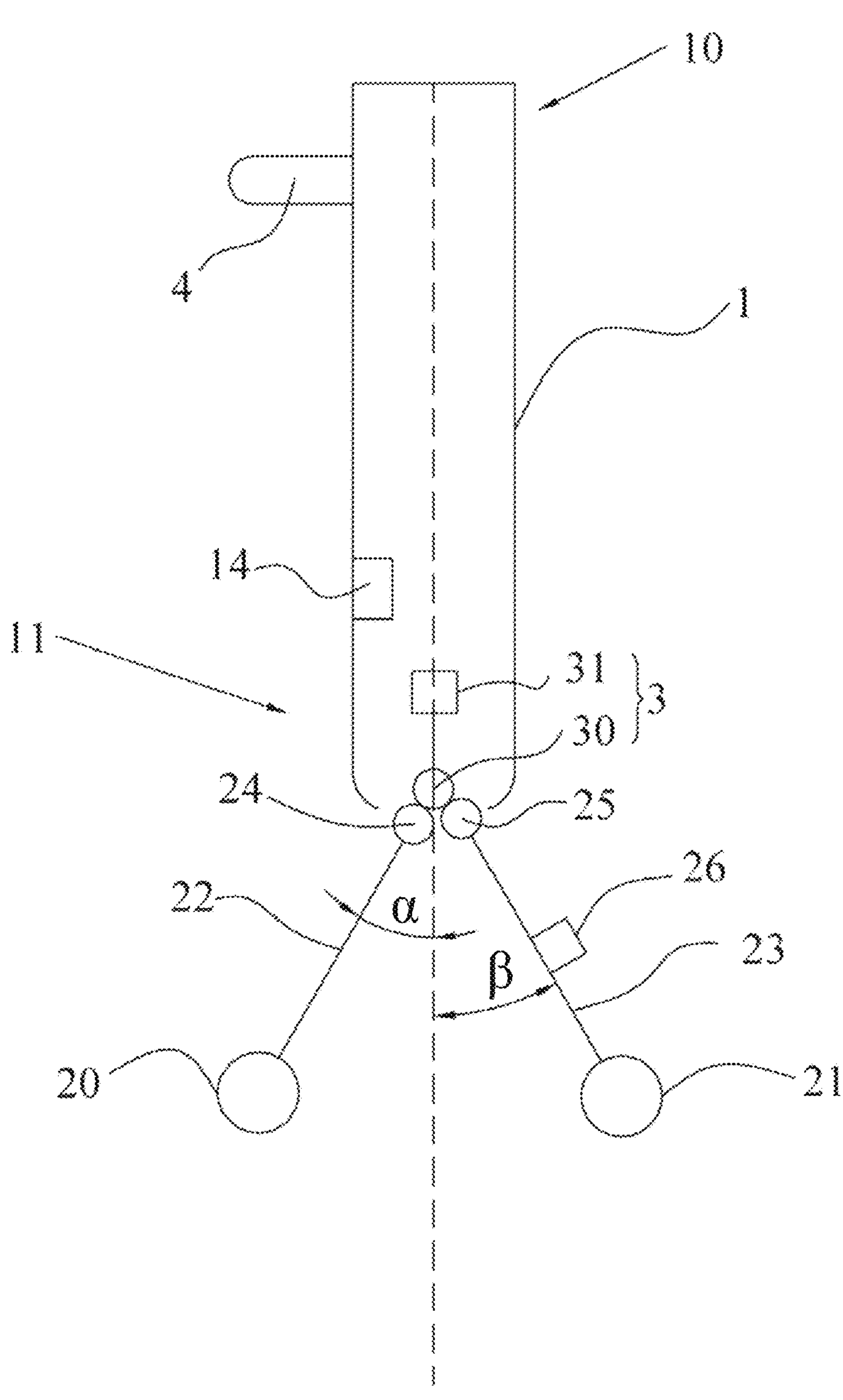
FIG. 1 is a schematic view of the walking mechanism for a quadruped robot according to an embodiment of the present invention in one state.
Figure 2:
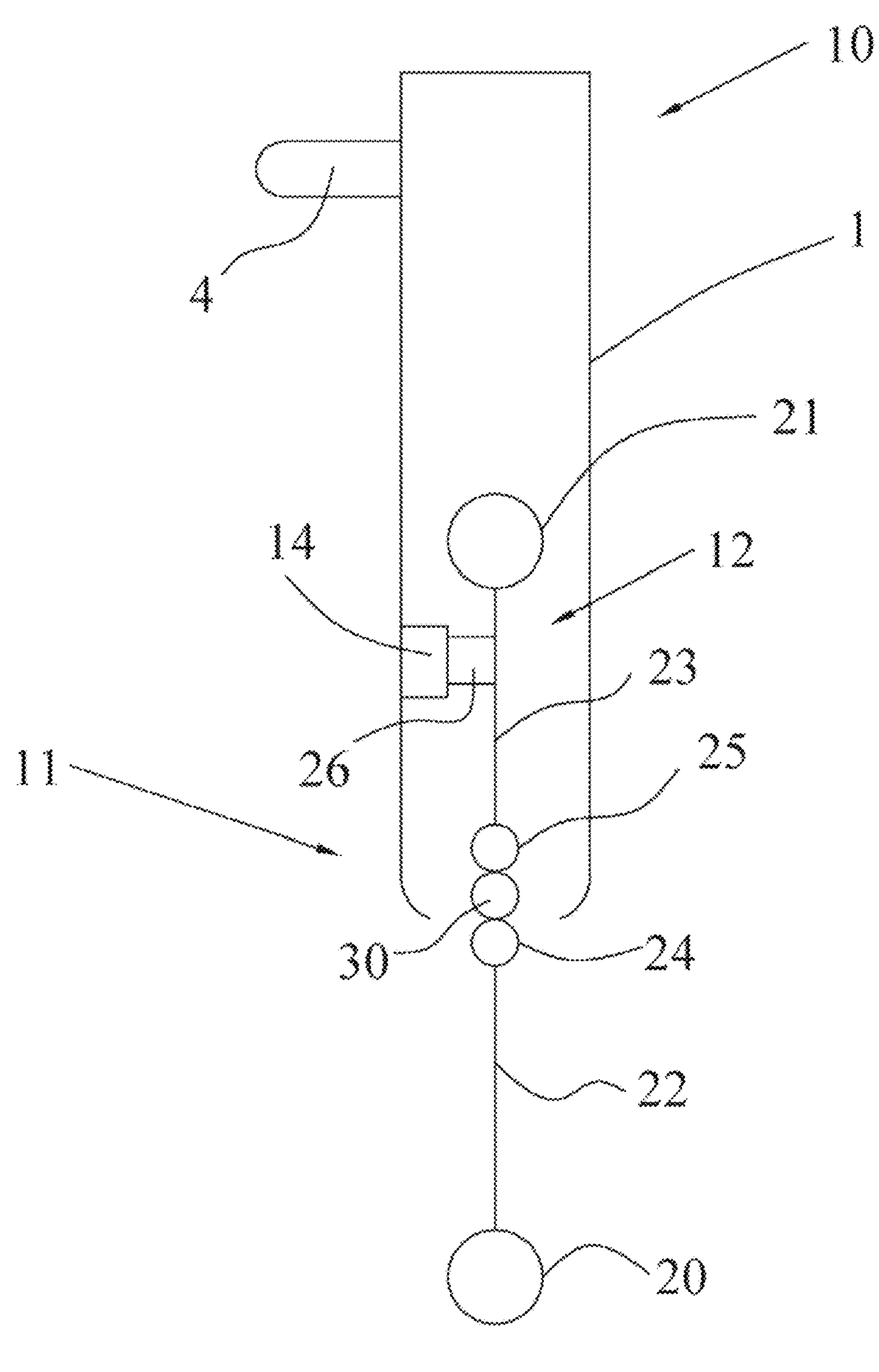
FIG. 2 is a schematic view of the walking mechanism for a quadruped robot according to an embodiment of the present invention in another state.

As shown in FIGS. 1 and 2, the present embodiment discloses a walking mechanism M for a quadruped robot, including a support arm 1 and a wheel mechanism.

The support arm 1 includes a first end 10 and a second end 11. The first end 10 is configured to connect to a main body of the quadruped robot, and the second end 11 is provided with a control device 3.

The wheel mechanism includes a first roller 20 and a second roller 21. The first roller 20 is connected to the control device 3 via a first connecting rod 22, and the second roller 21 is connected to the control device 3 via a second connecting rod 23.

The control device 3 is configured to control the first connecting rod 22 and the second connecting rod 23 to rotate or swing within a vertical plane, so as to place the wheel mechanism in a first state or a second state.

In the first state, as shown in FIG. 2, the first connecting rod 22 is deployed to a first angle relative to the central axis of the support arm 1, and the second connecting rod 23 is folded upward, such that the support arm 1 lands and walks based on the first roller 20, and the second roller 21 is in a suspended state.

In the second state, as shown in FIG. 1, the first connecting rod 22 is deployed to a second angle $\alpha$ relative to the central axis of the support arm 1, and the second connecting rod 23 is deployed to a third angle $\beta$ relative to the central axis of the support arm 1, such that the support arm 1 lands and walks based on the first roller 20 and the second roller 21, wherein the second angle is greater than the first angle.

The walking mechanism M in the present embodiment enables the quadruped robot to transition seamlessly and efficiently between flat terrain and complex terrain, thereby greatly enhancing the universal applicability of the quadruped robot.

Specifically, the rotation and swing of the first connecting rod 22 and the second connecting rod 23 can be precisely controlled by the control device 3, thereby achieving autonomous switching of the wheel mechanism between a single-wheel drive (first state) and a dual-wheel cooperative drive (second state).

In the first state, only the first roller 20 contacts the ground, and the second roller 21 is in a suspended state; at this time, the first roller 20 serves as the main load-bearing and driving component.

In the second state, both the first roller 20 and the second roller 21 contact the ground, forming dual-wheel cooperative drive and load-bearing.

By controlling the swing angles of the first connecting rod 22 and the second connecting rod 23, the control device 3 enables the wheel mechanism to quickly adjust its walking mode according to terrain changes, thereby adapting to different ground conditions.

More specifically, in flat terrain scenarios, when the wheel mechanism is in the first state, the second roller 21 is folded upward, and only the first roller 20 contacts the ground. This significantly reduces rolling friction resistance, allowing the quadruped robot to fully utilize the high efficiency and high-speed characteristics of wheeled drive, thereby improving movement speed and energy utilization efficiency.

In complex terrain scenarios such as slope climbing or step across, under the control device 3, the first connecting rod 22 and the second connecting rod 23 are synchronously deployed to the second angle and the third angle, so that the wheel mechanism is placed in the second state. In this state, the first roller 20 and the second roller 21 simultaneously form contact support with the slope surface or step edges, greatly increasing the ground contact area, thereby enhancing the driving torque and effectively suppressing slippage or overturning that are prone to occur with traditional single-wheel drives. This dual-wheel cooperative mechanism allows the quadruped robot to maintain high-speed continuous movement characteristics even on unstructured terrain like stair climbing or gravel roads, achieving continuous obstacle crossing. The first roller 20 and the second roller 21 form a stepped contact layout, wherein the first roller 20 is primarily responsible for traction and obstacle crossing, while the second roller 21 provides auxiliary support. Coupled with the self-balancing adjustment of the support arm 1, the stability of the mechanism is further enhanced.

The material of the support arm 1 can be selected based on the quadruped robot's overall weight, load-bearing requirements, and application environment. For example, a lightweight and high-strength carbon fiber composite material can be chosen to reduce the total weight of the mechanism and improve movement flexibility; or a high-strength aluminum alloy can be selected to provide better structural rigidity and durability.

In the present embodiments, the first connecting rod 22 and the second connecting rod 23 are controlled to be rotated, pivoted or swung, but in other embodiments, they also may be retractable, telescopic or foldable to provide more compact storage in different states or a longer extension distance, thereby optimizing the overall size of the mechanism and its obstacle-crossing capability.

Furthermore, the first angle is zero, and the second angle $\alpha$ satisfies $30° \leq \alpha \leq 60°$.

In the present embodiment, the first angle is set to zero, thus it's ensured that in the first state, the first roller 20 can land completely perpendicular to the central axis of the support arm 1, thereby maximizing the rolling efficiency of the first roller 20 and allowing the second roller 21 to be fully retracted and suspended, avoiding unnecessary friction and energy loss. Simultaneously, the second angle $\alpha$ is in the range of 30° to 60°, which aims to provide optimal support and driving force for the dual-wheel cooperative drive in the second state, thereby enabling the walking mechanism M to form a stable contact angle when facing slopes or obstacles, and finally effectively overcoming the terrain obstacles.

Specifically, when the first angle is zero, the first connecting rod 22 is parallel to or coincident with the central axis of the support arm 1, causing the axis of the first roller 20 to be perpendicular to the length direction of the support arm 1. This ensures pure rolling motion of the first roller 20 on the flat terrain, minimizing the sliding friction, thereby improving the movement speed and energy efficiency of the quadruped robot. When the second angle $\alpha$ is within the range of 30° to 60°, the first connecting rod 22 and the second connecting rod 23 can form a V-shaped support in the second state, allowing the dual rollers to simultaneously or alternately form effective contact with uneven ground, steps, or slopes. This angle range provides sufficient driving torque and stability to handle complex terrain while avoiding mechanism interference or insufficient support caused by excessively large or small angles.

Furthermore, the third angle is equal to the second angle.

As shown in FIG. 1, when the third angle is equal to the second angle, the first connecting rod 22 and the second connecting rod 23 are deployed outward at the same angle relative to the central axis of the support arm 1 in the second state, causing the first roller 20 and the second roller 21 to form a geometrically symmetrical or balanced configuration relative to the support arm 1. In this configuration, it helps to evenly distribute the weight and forces on the quadruped robot on the complex terrain, such as when climbing slopes or crossing steps, thereby avoiding overturning or slipping caused by uneven force distribution. When switching to the second state, the control device 3 only needs to control the first connecting rod 22 and the second connecting rod 23 to swing synchronously to the same target angle, which simplifies the design of the control algorithm and the actuating mechanism, and improves control precision and response speed. This angular relationship ensures that while the dual wheels provide a larger ground contact area and driving force, good stability is also maintained.

Furthermore, the control device 3 includes a first gear 30 arranged within the support arm 1 and a drive motor 31 connected to the first gear 30 for transmission. An end of the first connecting rod 22 opposite to the first roller 20 is provided with a second gear 24 meshing with the first gear 30. An end of the second connecting rod 23 opposite to the second roller 21 is provided with a third gear 25 meshing with the first gear 30.

The present embodiment provides a solution with a compact structure, reliable transmission, and precise control by adopting a gear transmission system to achieve smooth switching between the two walking states of the wheel mechanism.

The principle of the control device 3 in the present embodiment lies in gear meshing transmission to accurately transmit and convert the rotational power of the drive motor 31 into the swinging motion of the first connecting rod 22 and the second connecting rod 23.

The drive motor 31 is installed inside the support arm 1 and is connected to the first gear 30 via its output shaft. The first gear 30 acts as the driving gear, and its rotation drives the second gear 24 fixedly connected to the first connecting rod 22 and the third gear 25 fixedly connected to the second connecting rod 23 to rotate synchronously or according to a preset differential ratio. Under this gear set arrangement, the synchrony of the connecting rod swing or precise relative angle control can be ensured. By controlling the rotation direction and angle of the drive motor 31, the rotation angles of the second gear 24 and the third gear 25 can be precisely controlled, thereby achieving the rotational swing of the first connecting rod 22 and the second connecting rod 23 within the vertical plane. In such a way, the wheel mechanism can be flexibly switched between the first state and the second state and precisely held at the required angles.

In the embodiments, besides the gear transmission, other transmission mechanisms also may be used in the control device 3 to achieve the swing control of the first connecting rod 22 and the second connecting rod 23. For example, a lead screw transmission or a linkage mechanism combined with a servo motor may be used. The lead screw transmission can provide higher positioning accuracy and self-locking capability, which is suitable for scenarios requiring maintaining a specific angle for a long time; while the more complex linkage mechanism can achieve a larger swing range or specific motion trajectories within a limited space. The drive motor 31 can be different types and power ratings of motors, such as stepper motors, DC brushless motors, or servo motors, to meet different requirements for control precision, torque output, or response speed.

Furthermore, the second gear 24 and the third gear 25 do not necessarily have to mesh directly with the first gear 30; they can be connected via an intermediate gear set or a differential gear mechanism. For example, a differential gear can be configured to enable the first connecting rod 22 and the second connecting rod 23 to swing at asymmetric angles in the second state, so as to adapt to more complex obstacle crossing. The control device 3 also can be integrated with encoders or angle sensors to provide real-time feedback on the actual swing angles of the first connecting rod 22 and the second connecting rod 23, thereby forming a closed-loop control and further improving the accuracy and stability of angle control.

Furthermore, hub motors (not shown in the figure) are respectively arranged within the first roller 20 and the second roller 21.

In the present embodiment, hub motors are configured, which aims to integrate the drive unit directly into the rollers, thereby simplifying the mechanical structure, improving energy conversion efficiency, and achieving independent precise control of each roller.

Specifically, since the hub motors are directly integrated into the first roller 20 and the second roller 21 to directly drive the rollers, thus the intermediate transmission links such as traditional reducers and drive shafts are eliminated. Such a direct-drive mode greatly reduces mechanical losses and improves energy conversion efficiency. Each hub motor can independently receive instructions from the control device 3, which achieves precise control of the speed, torque, and steering of its respective roller.

In the first state, the hub motor of the first roller 20 provides the main driving force, enabling efficient single-wheel walking. In the second state, the hub motors of the first roller 20 and the second roller 21 work cooperatively, and independently adjust their respective outputs according to terrain and motion requirements, such as providing greater torque when climbing slopes or achieving differential drive when turning, thereby enhancing the flexibility and traversability of the mechanism. By this token, this distributed drive method improves the response speed and control precision of the system, thus the quadruped robot is flexibly adaptive to various terrains.

Additionally, the hub motors can be integrated with internal braking systems, such as electromagnetic brakes or regenerative braking, to provide additional stability and energy recovery functions when stopping or going downhill. The control strategy of the control device 3 for the hub motors can be further optimized, for example, by introducing torque control or position control to achieve finer motion control. In the second state, the two hub motors can cooperatively implement torque vectoring control, thereby adjusting the output of each roller in real time based on the terrain and load to optimize the climbing or obstacle crossing performance.

Figure 3:
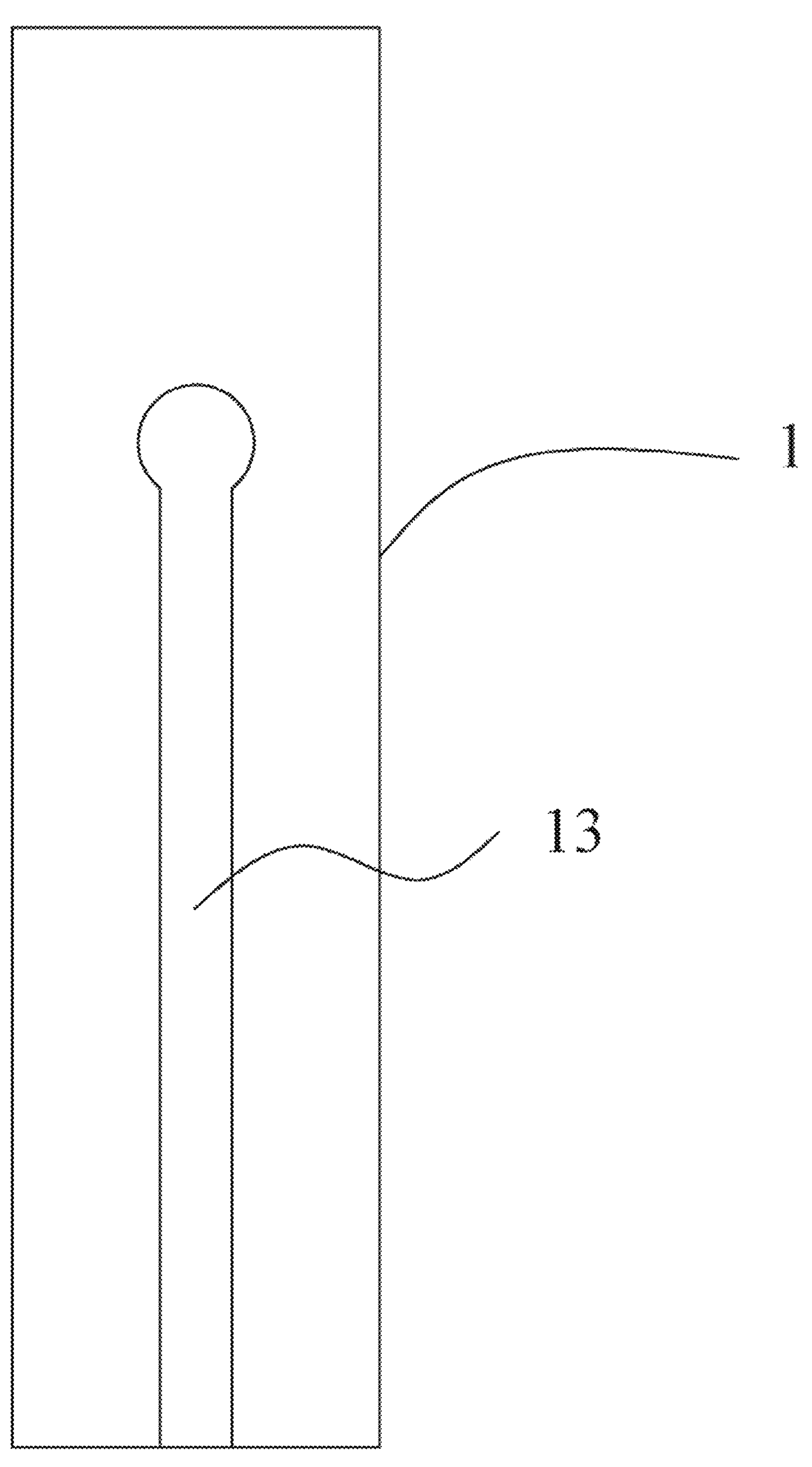
FIG. 3 is a schematic view of a support arm according to an embodiment of the present invention.

Furthermore, as shown in FIGS. 2 and 3, the support arm 1 has an accommodation cavity 12 inside, and a side surface of the support arm 1 is provided with an opening 13 communicating with the accommodation cavity 12. When the wheel mechanism is in the second state, the second connecting rod 23 and the second roller 21 are accommodated within the accommodation cavity 12 via the opening 13.

The present embodiment, by providing the accommodation cavity 12 and the opening 13 inside the support arm 1, allows the second roller 21 and the second connecting rod 23 to be fully accommodated in specific states, thereby solving the storage problem of external components and making the walking mechanism M more compact and streamlined.

Specifically, the support arm 1 is designed as a hollow structure, forming the accommodation cavity 12. When the wheel mechanism is in the first state, the control device 3 drives the second connecting rod 23 to swing, causing the second roller 21 to enter through the opening 13 on the side of the support arm 1 and be accommodated within the accommodation cavity 12. In such a way, the second roller 21 and the second connecting rod 23 can be effectively protected and hidden when not in use, thereby optimizing the overall integration of the mechanism, avoiding interference from the second roller 21 during movement in the first mode, and improving the overall streamlining and safety of the mechanism.

Additionally, the second connecting rod 23 is provided with a locking portion 26, and an inner side wall of the support arm 1 is provided with a matching portion 14. When the second connecting rod 23 is accommodated within the accommodation cavity 12, the locking portion 26 and the matching portion 14 are locked together.

Specifically, when the control device 3 drives the second connecting rod 23 to swing, causing it to fully enter the accommodation cavity 12 and reach a predetermined accommodation position, the locking portion 26 and the matching portion 14 will engage or adsorb with each other automatically or through a simple mechanical action, thereby firmly fixing the second connecting rod 23 and the second roller 21 within the accommodation cavity 12. This locking mechanism prevents any displacement or vibration in the second connecting rod 23 and the second roller 21 during the robot's movement, thereby avoiding unnecessary noise, wear, and potential failures, and improving the overall reliability and safety of the walking mechanism M.

Furthermore, the locking portion 26 includes any one of a suction cup, a magnetic member, or an engagement member.

When the locking portion 26 is a suction cup, it creates a negative pressure between itself and the matching portion 14 (e.g., a smooth plane) of the support arm 1. This generates an adsorption force to secure the second connecting rod 23. This method offers the advantages of quiet operation and no wear.

When the locking portion 26 is a magnetic member (e.g., a permanent magnet or an electromagnet), it generates magnetic attraction with the matching portion 14 (e.g., a ferromagnetic material) of the support arm 1. This provides contactless fixation, which features a fast response speed and also eliminates wear.

When the locking portion 26 is an engagement member, it achieves mechanical locking through the interaction of complementary geometric shapes, such as a protrusion and a groove. This arrangement provides a high-strength fixing force, making it suitable for applications that must withstand significant impact.

The control device 3 can, based on the selected locking manner, trigger the corresponding locking action after the second connecting rod 23 is accommodated in place, thereby ensuring the stable fixation of the second roller 21 within the accommodation cavity 12.

Furthermore, the control device 3 further includes a camera 4 provided on an exterior of the first end 10 of the support arm 1. The camera 4 is configured to detect the ground conditions around the support arm 1, and the wheel mechanism is configured to adaptively select to be in the first state or the second state based on the feedback from the camera 4.

The present embodiment, by integrating a visual perception system, enables the quadruped robot to perceive the ground conditions in real time and intelligently select the optimal walking mode accordingly, thereby achieving true environmental adaptation.

As the primary sensor for environmental perception, the camera 4 can capture image data of the ground around the support arm 1 in real time, including but not limited to visual data such as ground flatness, obstacle height (e.g., steps, gravel, and ramps), slope, and road surface texture.

This visual data is transmitted to the control device 3, where integrated image processing and decision-making algorithms analyze the received ground condition data. For example, when flat, open ground is detected, the control device 3 controls the wheel mechanism to switch to the first state (single-wheel drive mode) to enable higher efficiency and speed. When a slope, steps, or rugged terrain is detected, it switches the mechanism to the second state (dual-wheel cooperative drive mode) to provide greater driving force, stability, and obstacle-crossing capability.

This adaptive switching mechanism, based on real-time visual feedback, allows the quadruped robot to transition seamlessly and efficiently between different terrains, thus greatly enhancing its autonomy and environmental adaptability.

The decision-making algorithms inside the control device 3 may use deep learning models for terrain classification and obstacle recognition, thereby predicting future terrain change trends and further optimizing the adaptive selection strategy. For instance, beyond simply switching between the first and second states, the angle of the rollers in the second state can be dynamically adjusted based on parameters such as ground slope and obstacle height for better traversability. Furthermore, positioning and attitude sensors such as GPS or an inertial measurement unit can be integrated onto the support arm 1. This allows the system to combine ground condition information with the quadruped robot's own motion state for more complicated path planning and motion control.

Figure 4:
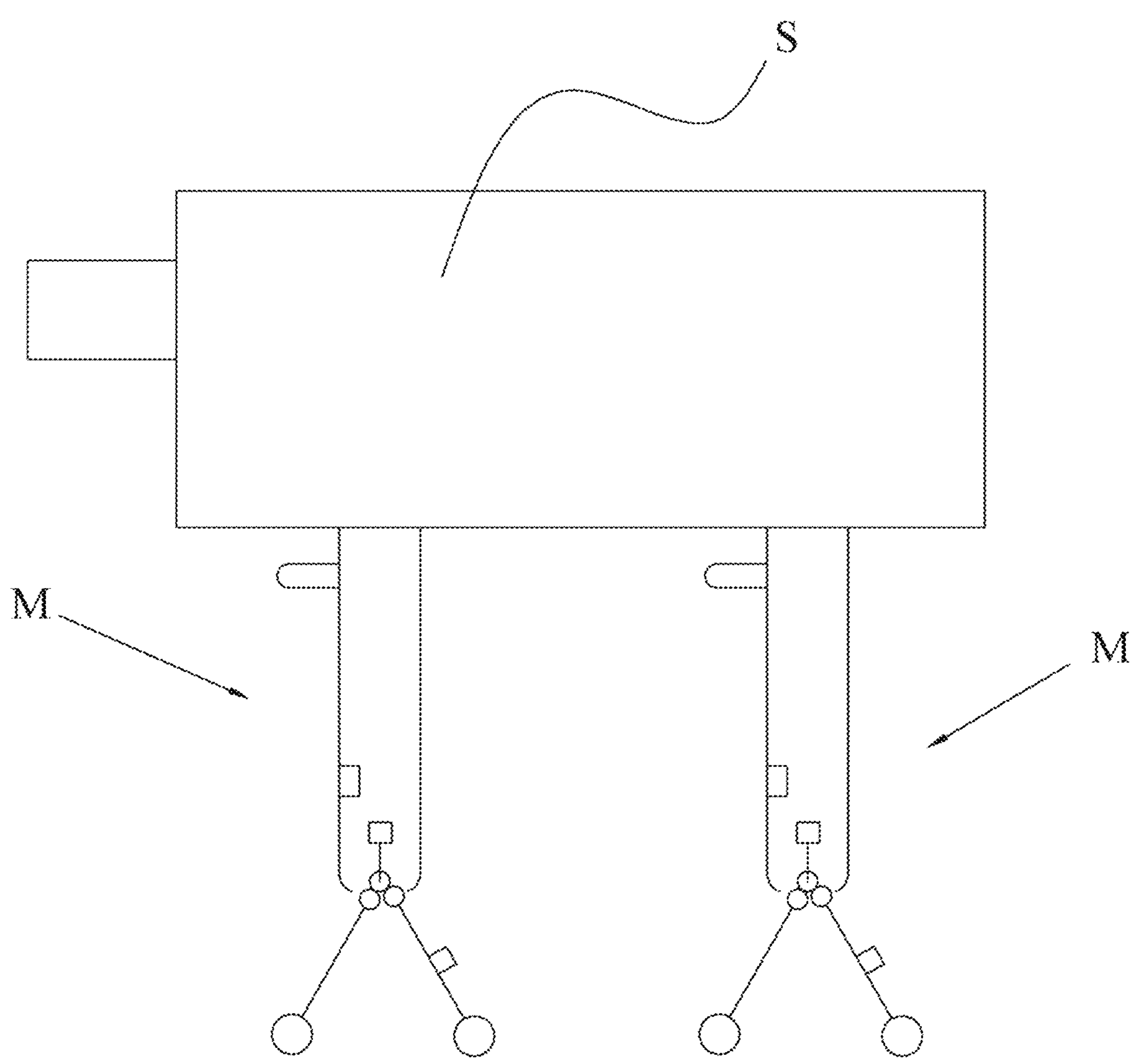
FIG. 4 is a schematic view of a quadruped robot according to an embodiment of the present invention.

In another preferred embodiment of the present invention, as shown in FIG. 4, a quadruped robot disclosed includes a main body S and a plurality of walking mechanisms M according to the above embodiments connected to the main body S.

The above disclosure is only preferred embodiments of the present invention and cannot be used to limit the scope of rights of the present invention. Therefore, any equivalent changes made in accordance with the claims of the present invention are within the scope of the present invention.

What is claimed is:

1. A walking mechanism for a quadruped robot, comprising:

a support arm, comprising a first end configured to connect to a main body of the quadruped robot and a second end provided with a control device; and a wheel mechanism, comprising a first roller connected to the control device via a first connecting rod and a second roller connected to the control device via a second connecting rod;

wherein the control device is configured to control the first connecting rod and the second connecting rod to rotate or swing within a vertical plane, causing the wheel mechanism to be in a first state or a second state;

in the first state, the first connecting rod is deployed to a first angle relative to a central axis of the support arm, and the second connecting rod is folded upward, such that the support arm lands and moves by the first roller, with the second roller suspended;

in the second state, the first connecting rod is deployed to a second angle relative to the central axis of the support arm, and the second connecting rod is deployed to a third angle relative to the central axis of the support arm, such that the support arm lands and moves by both the first roller and the second roller, wherein the second angle is greater than the first angle;

wherein the support arm is provided with an accommodation cavity inside, and a side surface of the support arm is provided with an opening communicating with the accommodation cavity; when the wheel mechanism is in the second state, the second connecting rod and the second roller are accommodated within the accommodation cavity via the opening;

wherein the second connecting rod is provided with a locking portion, and an inner side wall of the support arm is provided with a matching portion; when the second connecting rod is accommodated within the accommodation cavity, the locking portion is locked with the matching portion.

2. The walking mechanism for a quadruped robot according to claim 1, wherein the first angle is zero, and the second angle is indicated by $\alpha$ which satisfies: $30° \leq \alpha \leq 60°$.

3. The walking mechanism for a quadruped robot according to claim 1, wherein the third angle is equal to the second angle.

4. The walking mechanism for a quadruped robot according to claim 1, wherein the control device comprises a first gear arranged within the support arm and a drive motor connected to the first gear for transmission; an end of the first connecting rod opposite to the first roller is provided with a second gear meshing with the first gear, and an end of the second connecting rod opposite to the second roller is provided with a third gear meshing with the first gear.

5. The walking mechanism for a quadruped robot according to claim 1, wherein hub motors are respectively disposed within the first roller and the second roller.

6. The walking mechanism for a quadruped robot according to claim 1, wherein the locking portion comprises any one of a suction cup, a magnetic member, or an engagement member.

7. The walking mechanism for a quadruped robot according to claim 1, wherein the control device further comprises a camera provided on an exterior of the first end of the support arm for detecting ground conditions around the support arm, and the wheel mechanism adaptively selects to be in the first state or the second state based on feedback from the camera.

8. A quadruped robot, comprising a main body and walking mechanisms connected to the main body, wherein each of the walking mechanisms comprises:

a support arm, comprising a first end configured to connect to the main body and a second end provided with a control device; and a wheel mechanism, comprising a first roller connected to the control device via a first connecting rod and a second roller connected to the control device via a second connecting rod;

wherein the control device is configured to control the first connecting rod and the second connecting rod to rotate or swing within a vertical plane, causing the wheel mechanism to be in a first state or a second state;

in the first state, the first connecting rod is deployed to a first angle relative to a central axis of the support arm, and the second connecting rod is folded upward, such that the support arm lands and moves by the first roller, with the second roller suspended;

in the second state, the first connecting rod is deployed to a second angle relative to the central axis of the support arm, and the second connecting rod is deployed to a third angle relative to the central axis of the support arm, such that the support arm lands and moves by both the first roller and the second roller, wherein the second angle is greater than the first angle;

wherein the support arm is provided with an accommodation cavity inside, and a side surface of the support arm is provided with an opening communicating with the accommodation cavity; when the wheel mechanism is in the second state, the second connecting rod and the second roller are accommodated within the accommodation cavity via the opening;

wherein the second connecting rod is provided with a locking portion, and an inner side wall of the support arm is provided with a matching portion; when the second connecting rod is accommodated within the accommodation cavity, the locking portion is locked with the matching portion.

9. The quadruped robot according to claim 8, wherein the first angle is zero, and the second angle is indicated by $\alpha$ which satisfies: $30° \leq \alpha \leq 60°$.

10. The quadruped robot according to claim 8, wherein the third angle is equal to the second angle.

11. The quadruped robot according to claim 8, wherein the control device comprises a first gear arranged within the support arm and a drive motor connected to the first gear for transmission; an end of the first connecting rod opposite to the first roller is provided with a second gear meshing with the first gear, and an end of the second connecting rod opposite to the second roller is provided with a third gear meshing with the first gear.

12. The quadruped robot according to claim 8, wherein hub motors are respectively disposed within the first roller and the second roller.

13. The quadruped robot according to claim 8, wherein the locking portion comprises any one of a suction cup, a magnetic member, or an engagement member.

14. The quadruped robot according to claim 8, wherein the control device further comprises a camera provided on an exterior of the first end of the support arm for detecting ground conditions around the support arm, and the wheel mechanism adaptively selects to be in the first state or the second state based on feedback from the camera.

* * * * *